(12) United States Patent
Bae et al.

(10) Patent No.: US 11,241,848 B2
(45) Date of Patent: Feb. 8, 2022

(54) POST-PROCESSING METHOD FOR POLYMER ELECTROLYTE MEMBRANE

(71) Applicant: LG CHEM, LTD., Seoul (KR)

(72) Inventors: Insung Bae, Daejeon (KR); Hyuk Kim, Daejeon (KR); Sunghyun Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 86 days.

(21) Appl. No.: 16/636,824

(22) PCT Filed: Aug. 16, 2018

(86) PCT No.: PCT/KR2018/009380
§ 371 (c)(1),
(2) Date: Feb. 5, 2020

(87) PCT Pub. No.: WO2019/035655
PCT Pub. Date: Feb. 21, 2019

(65) Prior Publication Data
US 2021/0001577 A1  Jan. 7, 2021

(30) Foreign Application Priority Data
Aug. 17, 2017  (KR) .................... 10-2017-0104132

(51) Int. Cl.
*B29C 71/02* (2006.01)
*B29C 55/02* (2006.01)
*H01M 8/1086* (2016.01)

(52) U.S. Cl.
CPC .............. *B29C 71/02* (2013.01); *B29C 55/02* (2013.01); *H01M 8/109* (2013.01); *H01M 8/1093* (2013.01); *B29C 2071/022* (2013.01)

(58) Field of Classification Search
CPC ... B29C 71/02; B29C 55/02; B29C 2071/022; B29C 71/0009; B29C 71/0063;
(Continued)

(56) References Cited

U.S. PATENT DOCUMENTS 3,839,516 A * 10/1974 Williams .............. B29C 55/005
264/41
4,359,510 A * 11/1982 Taskier ................ H01M 50/411
429/144
(Continued)

FOREIGN PATENT DOCUMENTS

| CN | 101240079 A | 8/2008 |
| CN | 102658645 A | 9/2012 |

(Continued)

OTHER PUBLICATIONS

International Search Report issued in PCT/KR2018/009380 (PCT/ISA/210), dated Jan. 4, 2019.
(Continued)

*Primary Examiner* — Jeffrey M Wollschlager
(74) *Attorney, Agent, or Firm* — Birch, Stewart, Kolasch & Birch, LLP

(57) ABSTRACT

A post-processing method of a polymer electrolyte membrane, which anneals and stretches a polymer electrolyte membrane including a hydrocarbon-based copolymer in a vapor atmosphere of a solvent.

10 Claims, 3 Drawing Sheets

(58) Field of Classification Search
CPC .. B29C 71/0072; B29C 71/009; H01M 8/109; H01M 8/1093; H01M 2008/1095; H01M 2300/0082; H01M 8/1018–1083; H01M 8/1086; H01M 8/1088; B29K 2995/005; Y02E 60/50

See application file for complete search history.

(56) References Cited

U.S. PATENT DOCUMENTS

| | | | | |
|---|---|---|---|---|
| 5,910,378 | A * | 6/1999 | Debe | H01M 8/0239 |
| | | | | 429/483 |
| 10,829,600 | B2 * | 11/2020 | Yen | B32B 5/24 |
| 2007/0134533 | A1 | 6/2007 | Tamura et al. | |
| 2007/0173549 | A1 * | 7/2007 | Kanzaki | B01D 71/40 |
| | | | | 521/27 |
| 2007/0231654 | A1 * | 10/2007 | Ito | C08J 5/2287 |
| | | | | 429/483 |
| 2008/0124606 | A1 * | 5/2008 | Lin | H01M 8/1093 |
| | | | | 429/494 |
| 2013/0164598 | A1 * | 6/2013 | Ishihara | H01M 50/403 |
| | | | | 429/145 |
| 2014/0106230 | A1 | 4/2014 | Kim et al. | |
| 2017/0005354 | A1 * | 1/2017 | Inoue | H01B 1/122 |
| 2017/0012313 | A1 * | 1/2017 | Inoue | H01M 8/1027 |
| 2019/0267655 | A1 * | 8/2019 | Yamaguchi | H01M 8/1062 |

FOREIGN PATENT DOCUMENTS

| | | |
|---|---|---|
| GN | 102660120 A | 9/2012 |
| JP | 11-302434 A | 1/1999 |
| JP | 2007-39554 A | 2/2007 |
| JP | 2007-42592 A | 2/2007 |
| JP | 2007-66651 A | 3/2007 |
| JP | 2010-257598 A | 11/2010 |
| JP | 2013-139573 A | 7/2013 |
| JP | 2016-22680 A | 2/2016 |
| KR | 10-2002-0001035 A | 1/2002 |
| KR | 10-2003-0045324 A | 6/2003 |
| KR | 10-2007-0062925 A | 6/2007 |
| KR | 10-2014-0046849 A | 4/2014 |
| KR | 10-2017-0081440 A | 7/2017 |
| WO | WO 01/97957 A1 | 12/2001 |

OTHER PUBLICATIONS

Park et, "Control of Domain Orientation in Block Copolymer Electrolyte Membranes at the Interface with Humid Air", Advanced Materials, vol. 21, No. 2, 2009, pp. 203-208.

* cited by examiner

[Figure 1]
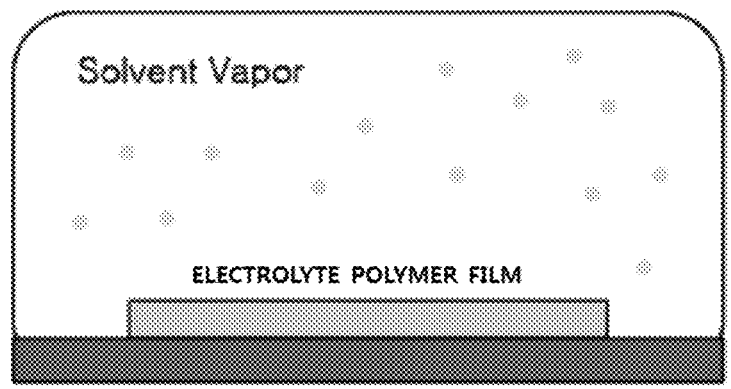
[Figure 2]
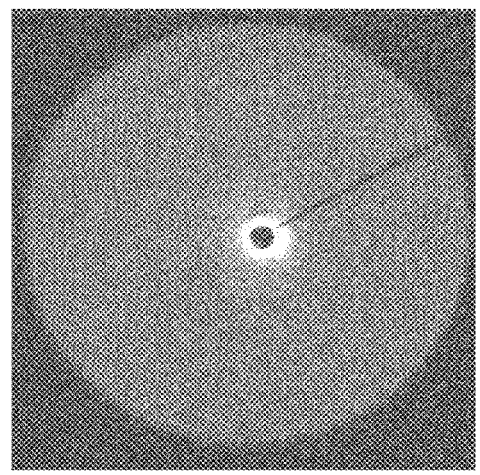

[Figure 3]
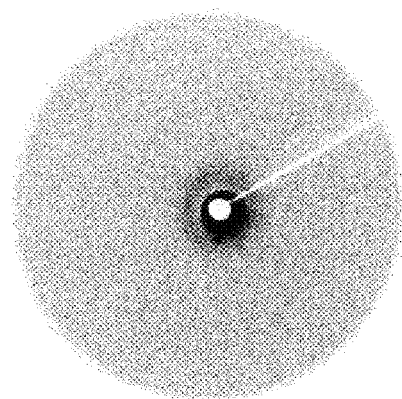
[Figure 4]
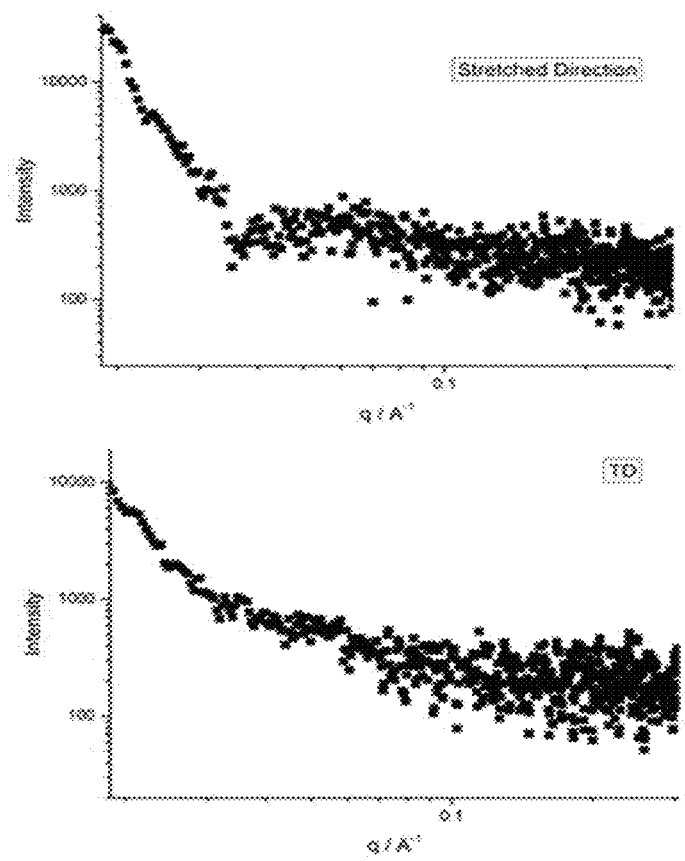

[Figure 5]
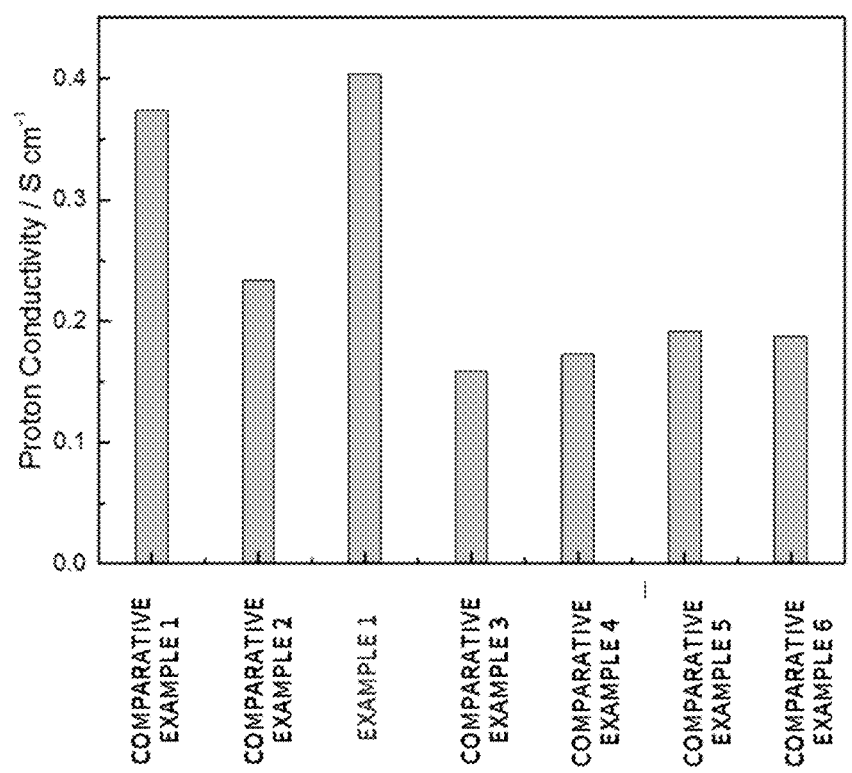

POST-PROCESSING METHOD FOR POLYMER ELECTROLYTE MEMBRANE

TECHNICAL FIELD

This application claims priority to and the benefit of Korean Patent Application No. 10-2017-0104132 filed in the Korean Intellectual Property Office on Aug. 17, 2017, the entire contents of which are incorporated herein by reference.

The present specification relates to a post-processing method of a polymer electrolyte membrane.

BACKGROUND ART

A polymer electrolyte membrane is used in the fields requiring ion exchange ability, such as a battery and a sensor, and specifically, the reinforced membrane has been used as an ion exchange membrane such as a fuel cell, a chemical sensor, and a flow battery.

Recently, as the depletion of existing energy resources such as petroleum or coal is expected, the need for energy capable of replacing these energy resources has been increasing, and as one of the alternative energies, interests in a fuel cell, a metal secondary battery, a flow battery, and the like has been focused.

As one of these alternative energies, studies on a fuel cell has been actively performed because the fuel cell is highly efficient and does not discharge pollutants such as NOx and SOx, and the fuel used is abundant. Along with these studies, there is also a need for studies on a reinforced membrane equipped with a polymer electrolyte membrane of a fuel cell.

With respect to a metal secondary battery, studies on increasing the efficiency in charge and discharge have been performed, and particularly, studies on a metal air secondary battery by adopting an air electrode of the fuel cell have also been performed. Accordingly, interests in a reinforced membrane equipped with an electrolyte membrane of a metal secondary battery have also been increased.

A flow battery is a secondary battery that is charged and discharged while circulating an electrolyte in which energy is stored, and studies on the flow battery along with the electrolyte membrane of the flow battery have been actively performed.

DETAILED DESCRIPTION OF THE INVENTION

Technical Problem

The present specification has been made in an effort to provide a post-processing method of a polymer electrolyte membrane.

Technical Solution

The present specification provides a post-processing method of a polymer electrolyte membrane, the method including: preparing a polymer electrolyte membrane including a hydrocarbon-based copolymer including a hydrophilic block and a hydrophobic block; and stretching the polymer electrolyte membrane by 1.5 times or more while annealing the polymer electrolyte membrane in a vapor atmosphere of a solvent.

Advantageous Effects

A polymer structure of a polymer electrolyte membrane may be controlled by a post-processing method of a polymer electrolyte membrane of the present specification.

A proton channel may be improved by inducing a phase separation of a polymer of a polymer electrolyte membrane by the post-processing method of the polymer electrolyte membrane of the present specification.

A degree of orientation of a polymer of a polymer electrolyte membrane may be increased by the post-processing method of the polymer electrolyte membrane of the present specification.

Ion conductivity of a polymer electrolyte membrane may be improved by the post-processing method of the polymer electrolyte membrane of the present specification.

BRIEF DESCRIPTION OF DRAWINGS

FIG. 1 is a schematic view of an annealing step of the present specification.

FIG. 2 is an SAXS measurement result of Comparative Example 1.

FIG. 3 is an SAXS measurement result of Comparative Example 3.

FIG. 4 is an SAXS measurement result according to the direction of Comparative Example 1, in which the upper figure is an SAXS result in a stretched direction, and the lower figure is an SAXS result in a direction vertical to the stretched direction.

FIG. 5 is an ion conductivity measurement result of Experimental Example 2.

BEST MODE

Hereinafter, the present specification will be described in detail.

The present specification relates to a post-processing method of a polymer electrolyte membrane, which anneals and simultaneously stretches a polymer electrolyte membrane including a hydrocarbon-based copolymer.

The present specification provides a post-processing method of a polymer electrolyte membrane, the method including: preparing a polymer electrolyte membrane including a hydrocarbon-based copolymer including a hydrophilic block and a hydrophobic block; and stretching the polymer electrolyte membrane by 1.5 times or more while annealing the polymer electrolyte membrane in a vapor atmosphere of a solvent.

The hydrocarbon-based polymer has lower ion conductivity than that of a fluorine-based polymer.

In order to improve the ion conductivity of the hydrocarbon-based polymer, the ion conductivity may be enhanced by stretching the electrolyte membrane in one direction to increase the degree of orientation of molecules of the polymer in the electrolyte membrane.

However, the hydrocarbon-based polymer exhibits very solid physical properties with a maximum tensile elongation being within several percent under the room temperature and low humidity conditions. In general, the process is performed at a temperature which is equal to or higher than a glass transition temperature (Tg) of a polymer in order to change physical properties of the polymer, and since a hydrocarbon-based polymer has a high glass transition temperature of about 160° C. or more unlike a fluorine-based polymer, it is difficult to implement the change in physical properties of the polymer in terms of stretching apparatuses and processes, and the hydrocarbon-based polymer is very inefficient even in terms of cost and efficiency of the process.

However, the post-processing method of the polymer electrolyte membrane according to the present specification has an advantage capable of more easily stretching a hydrocarbon-based polymer at high magnification. Specifically, the post-processing method of the polymer electrolyte membrane according to the present specification has an advantage capable of more easily stretching a hydrocarbon-based polymer by 1.5 times or more. More specifically, the post-processing method of the polymer electrolyte membrane according to the present specification has an advantage capable of more easily stretching a hydrocarbon-based polymer by 1.5 times to 3 times.

In the post-processing method of the polymer electrolyte membrane according to the present specification, a vapor atmosphere of a solvent is formed and the polymer electrolyte membrane is annealed and simultaneously stretched within a closed chamber as illustrated in FIG. 1, and in this case, there are effects in that a stretching rate is increased as compared to a case where annealing and stretching are separately performed, and a nanostructure arrangement of the polymer is enhanced, and as a result, there is an effect in that it is possible to obtain high ion conductivity.

In the preparing of the polymer electrolyte membrane, the polymer electrolyte membrane means a state where a process for producing a polymer electrolyte membrane is terminated, that is, a state where a solvent for applying or impregnating the polymer is removed.

In the present specification, 'a vapor atmosphere of a solvent' means a state where a solvent is present in a solution and vapor state in a hermetically sealed space, and means a state where a solvent in a vapor state formed by a volatilized solvent can impart mobility to an electrolyte polymer.

In an exemplary embodiment of the present specification, the polymer electrolyte membrane may include a hydrocarbon-based copolymer including a hydrophilic block and a hydrophobic block, and specifically, the polymer electrolyte membrane may be composed of one or more selected from sulfonated polyether ether ketone, sulfonated polyketone, sulfonated poly(phenylene oxide), sulfonated poly(phenylene sulfide), sulfonated polysulfone, sulfonated polycarbonate, sulfonated polystyrene, sulfonated polyimide, sulfonated polyquinoxaline, sulfonated (phosphonated) polyphosphazene, and sulfonated polybenzimidazole.

In an exemplary embodiment of the present specification, the hydrophilic block may include a hydrophilic group such as a sulfonic acid group, a carboxylic acid group, a phosphoric acid group, a phosphonic acid group, and derivatives thereof.

In an exemplary embodiment of the present specification, a thickness of the polymer electrolyte membrane may be 1 μm to 30 μm. When the thickness of the polymer electrolyte membrane is less than 1 μm, there is a problem in that the polymer electrolyte membrane has high gas permeability when applied to a fuel cell, and when the thickness of the polymer electrolyte membrane is more than 30 μm, there is a problem in that resistance to the transfer of protons is increased.

In an exemplary embodiment of the present specification, the annealing may include: putting the polymer electrolyte membrane into a hermetically sealed space; evaporating a solvent by putting the solvent into the hermetically sealed space; and annealing the polymer electrolyte membrane by the evaporated solvent.

A hydrocarbon-based electrolyte polymer forms a structure having a multi-block copolymer by the phase separation of a hydrophilic block and a hydrophobic block, and accordingly, groups of the hydrophilic group of the hydrophilic molecules form water channels.

In order to enhance the proton conductivity of a polymer electrolyte membrane and improve the performance of a membrane electrode assembly (MEA), a study of improving a channel of water and proton by controlling the structure of the polymer electrolyte membrane is essential.

The present specification may improve a proton channel by post-processing a hydrocarbon-based polymer electrolyte membrane to control the structure of the polymer and induce the phase separation. The present specification uses a principle in which mobility is imparted to a polymer through a solvent vapor annealing (SVA), and the polymer is recrystallized or phase-separated in the middle under a selective solvent vapor atmosphere.

In an exemplary embodiment of the present specification, the solvent is not particularly limited as long as the solvent may impart mobility to a polymer of a polymer electrolyte membrane, but the solvent may include at least one of an aprotic solvent and a protic solvent.

For example, the solvent may include an aprotic solvent selected from N,N'-dimethylacetamide (DMAc), N-methyl pyrrolidone (NMP), dimethyl sulfoxide (DMSO), and N,N-dimethylformamide (DMF); and one or more protic solvents selected from water, methanol, ethanol, propanol, N-butanol, isopropyl alcohol, decalin, acetic acid, and glycerol.

In an exemplary embodiment of the present specification, the temperature of the annealing may be 0° C. to 200° C. In this case, it is possible to evaporate the solvent and supply heat equal to or higher than the glass transition temperature (Tg) of the polymer of the polymer electrolyte membrane.

In an exemplary embodiment of the present specification, the time for supplying heat in the annealing may be 1 second to 100 hours.

In the annealing, the annealing time for exposing a polymer electrolyte membrane to a vapor atmosphere of a solvent may be 1 second to 100 hours.

In an exemplary embodiment of the present specification, the stretching of the polymer electrolyte membrane while annealing the polymer electrolyte membrane may mean annealing and simultaneously stretching the polymer electrolyte membrane, or may mean stretching the polymer electrolyte membrane while annealing the polymer electrolyte membrane in the same atmosphere as that of annealing the polymer electrolyte membrane annealed for a predetermined time or more.

In an exemplary embodiment of the present specification, in the stretching of the polymer electrolyte membrane while annealing the polymer electrolyte membrane, when the polymer electrolyte membrane is annealed and simultaneously stretched, the polymer is not sufficiently annealed in the initial period of the stretching, so that the polymer electrolyte membrane may be stretched by lowering the rate of stretching the polymer electrolyte membrane, and then slowly increasing the rate of stretching the polymer electrolyte membrane.

In an exemplary embodiment of the present specification, the rate of stretching the polymer electrolyte membrane may be 1 mm/min to 100 mm/s, preferably 1 mm/min to 100 mm/min, and more preferably 1 mm/min to 10 mm/min. In this case, there is an advantage in that it is possible to easily apply the method to a continuous process such as roll-to-roll.

When the stretching rate is changed, the stretching rate in the initial period of stretching may be 1 mm/min to 5 mm/min, and the final stretching rate may be 10 mm/s to 100 mm/s. In this case, there is an advantage in that an electrolyte polymer may be stably stretched without being damaged.

In an exemplary embodiment of the present specification, the post-processing method of the polymer electrolyte membrane may include: annealing the polymer electrolyte membrane in a vapor atmosphere of a solvent; and annealing and simultaneously stretching the polymer electrolyte membrane in the same atmosphere as that of annealing the polymer electrolyte membrane.

When the polymer electrolyte membrane is only annealed in a vapor atmosphere of a solvent, the time for the single annealing may be 5 minutes to 18 hours.

After the single annealing, when the polymer electrolyte membrane is annealed and simultaneously stretched in the same atmosphere as that of the annealing step, the rate of stretching the polymer electrolyte membrane may be 1 mm/min to 100 mm/s. In this case, there is an advantage in that it is possible to easily apply the method to a continuous process such as roll-to-roll.

In an exemplary embodiment of the present specification, in the stretching of the polymer electrolyte membrane, the polymer electrolyte membrane may be stretched by 1.5 times or more. In this case, there is an advantage in that the crystal structure of the electrolyte polymer may be aligned in one direction.

In an exemplary embodiment of the present specification, in the stretching of the polymer electrolyte membrane, the polymer electrolyte membrane may be stretched by 1.5 times to 3 times. In this case, there is an advantage in that the crystal structure of the electrolyte polymer is aligned in one direction, and simultaneously, an electrolyte membrane having a very small thickness may be formed.

Here, the stretching magnification is a ratio $(L_t/L_o)$ of a length $(L_t)$ after the stretching relative to a length $(L_o)$ before the stretching.

The stretching magnification may be expressed as a stretching percentage, and is a percentage of a stretched length $(L_t-L_o)$ relative to a length $(L_o)$ before the stretching, and the post-processing method of the polymer electrolyte membrane according to the present specification has an advantage capable of stretching a hydrocarbon-based polymer by 50% to 200%.

In an exemplary embodiment of the present specification, the polymer electrolyte membrane may be a polymer electrolyte membrane for a fuel cell.

The present specification provides a fuel cell including a polymer electrolyte membrane processed by the above-described post-processing method of the polymer electrolyte membrane.

The present specification provides a secondary battery including a polymer electrolyte membrane processed by the above-described post-processing method of the polymer electrolyte membrane.

In comparison with the post-processing of the polymer electrolyte membrane of the present specification, during the process of forming a polymer electrolyte membrane, a solvent vapor processing using a solvent included in a composition for a polymer electrolyte membrane for forming the membrane is performed only in a solvent vapor atmosphere including an inherent solvent of the composition for a polymer electrolyte membrane while the inherent solvent is evaporated. For example, when a solvent vapor processing is performed during the process of forming a membrane with a composition for a polymer electrolyte membrane, which includes a solvent A, the annealing is carried out in an environment where the vapor of the solvent A evaporated from the composition for a polymer electrolyte membrane is also mixed with the vapor of a solvent B for a solvent annealing.

Meanwhile, when a polymer electrolyte membrane is manufactured by removing a solvent, and the like, and then the manufactured polymer electrolyte membrane is post-processed, a solvent vapor atmosphere may be formed by a solvent for annealing under accurate ratios and conditions because there is no residual solvent included in the polymer electrolyte membrane.

A polymer structure of a polymer electrolyte membrane may be controlled by the post-processing method of the polymer electrolyte membrane of the present specification.

A proton channel may be improved by inducing a phase separation of a polymer of a polymer electrolyte membrane by the post-processing method of the polymer electrolyte membrane of the present specification.

Hereinafter, the present specification will be described in more detail through Examples. However, the following Examples are provided only for exemplifying the present specification, but are not intended to limit the present specification.

Mode for Invention

EXAMPLES

Preparation Example 1

1) Manufacture of Polymer Electrolyte Membrane

After a sulfonated polyether-ether ketone-based polymer was dissolved in a dimethyl sulfoxide (DMSO) solvent, a membrane having a thickness of about 20 μm was manufactured by applying the resulting solution onto a substrate by a solution casting method using a film applicator. After the manufactured membrane was slowly warmed to 100° C., dried for about 24 hours, and then acid-treated with 10% sulfuric acid at 80° C. for 24 hours, a final polymer electrolyte membrane was manufactured by washing the treated membrane with distilled water and drying the washed membrane in an oven at 80° C.

2) Solvent Vapor Annealing of Polymer Electrolyte Membrane

The manufactured polymer electrolyte membrane was put into a closed jar, and 1,000 μl of DMSO was put together into a vial, such that the solvent is not directly brought into contact with a polymer film. The vial was kept closed at room temperature for 3 hours.

Preparation Example 2

After a sulfonated polyether-ether ketone-based polymer was dissolved in a dimethyl sulfoxide (DMSO) solvent, a membrane having a thickness of about 20 μm was manufactured by applying the resulting solution onto a substrate by a solution casting method using a film applicator. After the manufactured membrane was slowly warmed to 100° C., dried for about 24 hours, and then acid-treated with 10% sulfuric acid at 80° C. for 24 hours, a final polymer electrolyte membrane was manufactured by washing the treated membrane with distilled water and drying the washed membrane in an oven at 80° C.

Preparation Example 3

After a sulfonated polyether-ether ketone-based polymer was dissolved in a dimethyl sulfoxide (DMSO) solvent, a membrane having a thickness of about 20 μm was manufactured by applying the resulting solution onto a substrate by a solution casting method using a film applicator. The manufactured membrane was dried at 80° C. for about 3 hours, and a semi-dried polymer electrolyte membrane was manufactured.

Preparation Example 4

After a sulfonated polyether-ether ketone-based polymer was dissolved in a dimethyl sulfoxide (DMSO) solvent, a membrane having a thickness of about 20 μm was manufactured by applying the resulting solution onto a substrate by a solution casting method using a film applicator. The manufactured membrane was dried at 80° C. for about 6 hours, and a semi-dried polymer electrolyte membrane was manufactured.

Preparation Example 5

After a sulfonated polyether-ether ketone-based polymer was dissolved in a dimethyl sulfoxide (DMSO) solvent, a membrane having a thickness of about 20 μm was manufactured by applying the resulting solution onto a substrate by a solution casting method using a film applicator. The manufactured membrane was dried at 80° C. for about 9 hours, and a semi-dried polymer electrolyte membrane was manufactured.

Example 1

After a beaker containing 50 mL of DMSO was placed into a closed chamber of a SHIMADZU AGS-X 100N UTM (Universal Test Machine) apparatus, a solvent vapor atmosphere was created while keeping the electrolyte membrane in Preparation Example 2 at room temperature for 24 hours by fastening the electrolyte membrane to the apparatus. The electrolyte membrane was annealed and simultaneously stretched by carrying out stretching by 200% at a rate of 5 mm/min under the vapor atmosphere.

Comparative Example 1

For stretching the electrolyte membrane in Preparation Example 1, SHIMADZU AGS-X 100N UTM (Universal Test Machine) was used, and the electrolyte membrane was stretched by 200% at a rate of 5 mm/min under room temperature and low humidity conditions (30% RH) in the air for 10 minutes. In this case, the electrolyte membrane annealing-treated through Preparation Example 1 was stretched at room temperature without an additional drying process.

Comparative Example 2

The electrolyte membrane was stretched in the same manner as in Comparative Example 1, except that the electrolyte membrane was stretched by 50% instead of 200% in Comparative Example 1.

Comparative Example 3

A hydrocarbon-based electrolyte membrane, which was manufactured in Preparation Example 2 and was not annealing-treated, was used as Comparative Example 3 without being stretched.

Comparative Example 4

The hydrocarbon-based electrolyte membrane in Preparation Example 2 was stretched under the same conditions as in Comparative Example 1 in a completely dried state without being annealing-treated, but the hydrocarbon-based electrolyte membrane could be stretched only up to 10%.

Comparative Example 5

The electrolyte membrane manufactured in Preparation Example 3, in which the residual solvent remained, was stretched under the same conditions as in Comparative Example 1, but the electrolyte membrane could be stretched only up to 30%.

In this case, as a result of calculating the amount of residual solvent in the electrolyte membrane in Preparation Example 3 as a rate of change in the weight after the electrolyte membrane was primarily dried (80° C., 3 hours) and the weight after the electrolyte membrane was completely dried (100° C., 24 hours), the ratio of the residual solvent in the electrolyte membrane in Preparation Example 3 was about 22%.

Comparative Example 6

The electrolyte membrane manufactured in Preparation Example 4, in which the residual solvent remained, was stretched under the same conditions as in Comparative Example 1, but the electrolyte membrane could be stretched only up to 20%.

In this case, as a result of calculating the amount of residual solvent in the electrolyte membrane in Preparation Example 4 as a rate of change in the weight after the electrolyte membrane was primarily dried (80° C., 6 hours) and the weight after the electrolyte membrane was completely dried (100° C., 24 hours), the ratio of the residual solvent in the electrolyte membrane in Preparation Example 4 was about 9%.

Comparative Example 7

The electrolyte membrane manufactured in Preparation Example 5, in which the residual solvent remained, was stretched under the same conditions as in Example 1, but the electrolyte membrane could be stretched only up to 15%.

In this case, as a result of calculating the amount of residual solvent in the electrolyte membrane in Preparation Example 5 as a rate of change in the weight after the electrolyte membrane was primarily dried (80° C., 9 hours) and the weight after the electrolyte membrane was completely dried (100° C., 24 hours), the ratio of the residual solvent in the electrolyte membrane in Preparation Example 5 was about 5%.

Experimental Example 1

The small angle X-ray scattering (SAXS) of each of Comparative Examples 1 and 3 was measured, and the results are illustrated in FIGS. 2 to 4.

FIGS. 2 and 4 are SAXS measurement results of Comparative Example 1, and particularly, the upper figure of FIG. 4 is an SAXS result in the stretched direction, and the lower figure of FIG. 4 is an SAXS result in a direction vertical to the stretched direction. Through FIG. 4, it can be seen that the crystallinity in the stretched direction is observed, and the crystallinity in a direction vertical to the stretched direction is not observed.

FIG. 3 is an SAXS measurement result of Comparative Example 3.

According to FIGS. 2 and 3, it could be confirmed that Comparative Example 1 in which the annealing was performed had crystal anisotropy unlike Comparative Example 3 in which the annealing was not performed.

Experimental Example 2

For an ion conductivity analysis, each electrolyte membrane with a size of 1 cm×4 cm was prepared and evaluated by using a 4-point probe measurement apparatus. The electrolyte membrane was evaluated under the 100% RH condition by using a Bio-Logics, HCP-803 apparatus.

The results are illustrated in FIG. 5.

According to FIG. 5, it can be seen that the ion conductivity in Example 1 is higher than those in Comparative Examples 1 to 6. Specifically, it can be confirmed that the ion conductivity in Example 1 is shown to be higher than those in Comparative Examples 3 to 6 in which the annealing was not carried out and those in Comparative Examples 1 and 2 in which the stretching was carried out after the annealing. Through the result in FIG. 5, it can be seen that when annealing and stretching are simultaneously carried out, it is effective for increasing ion conductivity.

The invention claimed is:

1. A post-processing method of a polymer electrolyte membrane, the method comprising:
preparing a polymer electrolyte membrane comprising a hydrocarbon-based copolymer comprising a hydrophilic block and a hydrophobic block; and
simultaneously stretching the polymer electrolyte membrane in the same atmosphere as that of annealing the polymer electrolyte membrane by 1.5 times or more while annealing the polymer electrolyte membrane in a vapor atmosphere of a solvent.

2. The post-processing method of claim 1, wherein the polymer electrolyte membrane is stretched by 1.5 times to 3 times.

3. The post-processing method of claim 1, wherein the solvent comprises at least one selected from the group consisting of an aprotic solvent and a protic solvent.

4. The post-processing method of claim 1, wherein the solvent comprises (a) an aprotic solvent selected from the group consisting of N,N'-dimethylacetamide (DMAc), N-methyl pyrrolidone (NMP), dimethyl sulfoxide (DMSO), and N,N-dimethylformamide (DMF) and (b) one or more protic solvents selected from the group consisting of water, methanol, ethanol, propanol, N-butanol, isopropyl alcohol, decalin, acetic acid, and glycerol.

5. The post-processing method of claim 1, wherein an annealing time in the annealing of the polymer electrolyte membrane is 1 second to 100 hours.

6. The post-processing method of claim 1, wherein an annealing temperature in the annealing of the polymer electrolyte membrane is 0° C. to 200° C.

7. The post-processing method of claim 1, wherein the hydrophilic block comprises at least one selected from the group consisting of a sulfonic acid group, a carboxylic acid group, a phosphoric acid group, a phosphonic acid group, and derivatives thereof.

8. The post-processing method of claim 1, wherein a rate of stretching the polymer electrolyte membrane is 1 mm/min to 100 mm/s.

9. The post-processing method of claim 1, wherein a thickness of the polymer electrolyte membrane is 1 µm to 30 µm.

10. The post-processing method of claim 1, wherein the polymer electrolyte membrane is a polymer electrolyte membrane suitable for a fuel cell.

* * * * *